United States Patent
Kleineidam et al.

(10) Patent No.: US 7,150,585 B2
(45) Date of Patent: Dec. 19, 2006

(54) PROCESS AND EQUIPMENT FOR THE CONVEYANCE OF POWDERED MATERIAL

(75) Inventors: Andreas Kleineidam, Elmshorn (DE); Wilhard Kleineidam, Hamburg (DE)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 10/501,693

(22) PCT Filed: Oct. 1, 2003

(86) PCT No.: PCT/EP03/10857

§ 371 (c)(1),
(2), (4) Date: Oct. 20, 2004

(87) PCT Pub. No.: WO2004/087331

PCT Pub. Date: Oct. 14, 2004

(65) Prior Publication Data

US 2005/0095071 A1 May 5, 2005

(30) Foreign Application Priority Data

Oct. 14, 2002 (DE) ............... 102 47 829
Dec. 24, 2002 (DE) ............... 102 61 053

(51) Int. Cl.
*B65G 53/66* (2006.01)
(52) U.S. Cl. ................ 406/50; 406/90; 406/127; 406/146; 406/192; 406/196
(58) Field of Classification Search ............ 406/50, 406/90, 91, 127, 128, 144, 146, 192, 196
See application file for complete search history.

(56) References Cited

U.S. PATENT DOCUMENTS

| 2,151,514 A | 3/1939 | Heinen |
| 2,536,300 A | 1/1951 | Martin |
| 2,667,280 A | 1/1954 | Lane et al. |
| 3,260,285 A * | 7/1966 | Vogt ............... 141/8 |
| 3,463,553 A | 8/1969 | Boucraut et al. |

(Continued)

FOREIGN PATENT DOCUMENTS

DE          1087520          8/1960

(Continued)

OTHER PUBLICATIONS

International Search Report from PCT/EP03/10857 (parent application).

*Primary Examiner*—Joe Dillon, Jr.
(74) *Attorney, Agent, or Firm*—Calfee Halter & Griswold LLP

(57) ABSTRACT

The invention concerns a process and a device (2) for the pneumatic conveyance of powdered material (4), in which a cylindrical chamber (10, 12), which can be connected with a reservoir (6) by a sealable inlet (14, 16) and with a delivery line (28) by a sealable outlet (18, 20), is alternately filled with material from the reservoir (6) and emptied of this material by applying a negative pressure to the chamber with its outlet (18, 20) closed and its inlet (14, 16) open through a bordering wall formed by a gas-permeable filter element (50) to draw material into the chamber (10, 12) from the reservoir (6), and by then admitting a gas under pressure into the chamber (10, 12) with its inlet (14, 16) closed and its outlet (18, 20) open to force the material previously drawn into the chamber (10, 12) out of the chamber and into the delivery line (28). To prolong the service life of the filter element (50) and to avoid contamination of the filter element more easily, it is proposed, in accordance with the invention, that the filter element (50) be designed as a hollow cylinder and that it surround at least a portion of the chamber (10, 12).

9 Claims, 7 Drawing Sheets

U.S. PATENT DOCUMENTS

| | | |
|---|---|---|
| 3,604,758 A | 9/1971 | Flain et al. |
| 3,659,151 A | 4/1972 | Febre |
| 3,788,368 A * | 1/1974 | Geng et al. .................... 141/67 |
| 3,923,343 A * | 12/1975 | Bird ............................ 406/14 |
| 3,932,065 A | 1/1976 | Ginsberg et al. |
| 3,994,627 A | 11/1976 | Calzolari |
| 4,143,819 A | 3/1979 | Hastings |
| 4,241,880 A | 12/1980 | Hastings |
| 4,502,629 A | 3/1985 | McGhee et al. |
| 4,545,410 A * | 10/1985 | Paul et al. .................... 141/18 |
| 4,576,827 A | 3/1986 | Hastings |
| 4,613,083 A | 9/1986 | Mulder et al. |
| 4,630,777 A | 12/1986 | Hollstein et al. |
| 4,638,951 A | 1/1987 | Gabriel |
| 4,739,935 A | 4/1988 | Hastings et al. |
| 4,893,966 A | 1/1990 | Roehl |
| 5,252,037 A | 10/1993 | Carlson |
| 5,615,830 A | 4/1997 | Matsunaga et al. |
| 5,620,138 A | 4/1997 | Crum |
| 5,657,704 A * | 8/1997 | Schueler .................... 110/106 |
| 5,700,323 A | 12/1997 | Koch |
| 5,788,728 A | 8/1998 | Solis et al. |
| 5,935,283 A * | 8/1999 | Sweeney et al. ............... 55/431 |
| 6,056,483 A * | 5/2000 | Nakamura et al. .......... 406/134 |
| 6,079,461 A * | 6/2000 | Fisher et al. ................. 141/231 |
| 6,325,572 B1 | 12/2001 | Dietrich |
| 6,478,513 B1 * | 11/2002 | Higuchi et al. ................ 406/19 |
| 6,508,610 B1 | 1/2003 | Dietrich |
| 6,623,215 B1 | 9/2003 | Dietrich |
| 6,663,325 B1 * | 12/2003 | Kai et al. ...................... 406/46 |
| 6,953,315 B1 * | 10/2005 | Cartwright .................. 414/217 |

FOREIGN PATENT DOCUMENTS

| | | |
|---|---|---|
| DE | 19654648 | 4/1998 |
| DE | 19654523 | 7/1998 |
| EP | 124 933 | 11/1984 |
| EP | 347 544 | 12/1989 |
| EP | 680 790 | 11/1995 |
| EP | 1080789 | 3/2001 |
| EP | 1084759 | 3/2001 |
| EP | 1437178 | 7/2004 |
| GB | 1236772 | 6/1971 |
| JP | 09 (1997) 71325 | 3/1997 |
| JP | 9-150105 | 6/1997 |
| WO | WO 82/00349 | 2/1982 |
| WO | WO 01/19529 | 3/2001 |
| WO | WO 03/024612 | 3/2003 |
| WO | WO 05/05060 | 1/2005 |
| WO | WO 05/018823 | 3/2005 |

* cited by examiner

PROCESS AND EQUIPMENT FOR THE CONVEYANCE OF POWDERED MATERIAL

The invention concerns a process and device for conveying powdered material. The process and device are used especially in powder coating installations to convey powder coating material by compressed air in dense phase from a reservoir into a delivery line and through this to a spray gun or other type of spray application device.

Until now, in powder coating installations, the powder coating material was usually pneumatically conveyed by the dilute phase method from a reservoir to a spray gun through a hose-like delivery line. However, this causes problems, because, first, relatively large amounts of compressed air are needed, second, the diameter of the hose-like delivery line must be relatively large, and third, wear occurs at the bends in the delivery lines. For this reason, over the past several years, tests have been conducted at a number of powder coating installations with so-called plug flow conveying or dense phase conveying, in which the powder coating material is cyclically conveyed either by gravity or by negative pressure into a chamber and then discharged from the chamber with compressed air and conveyed in the form of successive "plugs" through the delivery line to the spray application device.

A process and device of the type cited at the beginning for the plug flow or dense phase conveyance of powdered materials with suction by negative pressure is already known from DE 196 43 523, DE 196 54 649, and EP 0 937 004 B1. The previously known device has a cylindrical pump chamber, which is equipped with a discharge opening for the conveyed material at its lower end and a plate-like filter element that is impenetrable by the conveyed material at its upper end, by which the pump chamber can be alternately connected with a vacuum pump and with a source of compressed gas, to suck the conveyed material from a reservoir through a connection that opens into the pump chamber from the side for the purpose of filling the pump chamber, or to push the conveyed material through the discharge opening into a discharge line for the purpose of emptying the pump chamber. To allow exact metering of the conveyed material and at the same time a high discharge volume, the pump chamber should have a filling volume that is as small as possible, and it should be possible to fill it and empty it in an operating cycle that is as short as possible. To achieve the latter objective, however, the gas must be sucked from the pump chamber and fed into the pump chamber relatively quickly, which requires a pressure difference that is as large as possible between the inside of the pump chamber and the source of negative pressure or the source of compressed gas. However, a high pressure difference at the filter element causes larger bending loads and pressure loads on the filter element and thus a reduction of its service life, which is why the filter element must be supported with support lattices or the like. However, this in turn results in a reduction of its passage cross section, which makes it necessary to choose between a greater load and thus a shorter service life of the filter element and a higher gas throughput and thus a shorter operating cycle. In the case of the pneumatic conveyance of powder coating material, there is the additional consideration that this material has a particle size of <80 µm, and about 10–15% of this material is in the particle size range of <5 µm. Since this is of the same order of magnitude as the pore diameter of the filter materials that are used, small particles can penetrate deeply into the filter element or even pass through it. Some of the particles that were mentioned first are retained in the filter element during the subsequent admission of compressed gas and may not become detached from the filter element again until after a prolonged period of time, which can lead to contamination of the coated surface after a color change. The particles mentioned last can cause pump damage, at least when diaphragm pumps are used to produce the negative pressure. However, the use of a smaller pore diameter to avoid these problems would in turn result in a lower gas throughput and thus longer operating cycles. Furthermore, in the previously known device, when the chamber is emptied, residual pigmented powder coating material can also remain inside the suction intake connection, which can also result in contamination of the powder coating material during a color change.

Proceeding on the basis of this prior art, the object of the invention is to improve a process and device of the type specified at the beginning in such a way that the service life of the filter element is prolonged and contamination of the filter element can be more easily avoided.

In accordance with the invention, this object is achieved by designing the gas-permeable filter element as a hollow cylinder in such a way that it forms a part of the cylindrical surface of the chamber, unlike the filter element of the state of the art, in which it is designed as an end wall of the chamber. The invention is based on the idea that this measure provides a simple means of increasing the filter surface of the filter element and thus reducing the pressure difference between the outer and inner surface of the filter element at the same gas throughput, without increasing the volume of the chamber and thus adversely affecting the metering precision. Furthermore, as a filter element constructed as a section of the cylindrical wall, it allows axial conveyance of the powdered material through the chamber in a straight line, which ensures frictionless conveyance, unlike the situation with a filter element installed on an end face. Moreover, no moving parts are required other than at the chamber inlet and outlet.

It is advantageous for the hollow-cylindrical filter element to be made of a sintered material, preferably a sintered plastic powder, since, when rigid filter materials of this type are used, the use of a support material becomes unnecessary. In addition, a cylindrical filter element made of a rigid filter material has greater stability than a flat filter element of the same size and therefore can be produced with a smaller wall thickness at equivalent permeability. It is advantageous for the pore diameter of the sintered material to be smaller than the smallest particle diameter of the powdered material being conveyed, i.e., in the case of the conveyance of powder coating material, preferably smaller than 5 µm.

To ensure uniform admission of negative pressure and compressed gas, it is advantageous to surround the filter element with a housing, which is separated from the filter element by a cylindrical annular space. The annular space can be alternately connected with a negative pressure source and a compressed gas source, either by a single connection or, preferably, by two connections, one of which is located in the vicinity of its end face facing the outlet and can be acted upon by negative pressure, while the other is located in the vicinity of its end face facing the inlet and can be acted upon by compressed gas. The latter arrangement allows a considerable increase in conveyance capacity due to more rapid and complete filling of the chamber and due to more rapid and complete emptying of the chamber.

A further increase in conveyance capacity can be achieved by selecting an optimum ratio between the length and the inside diameter of the hollow-cylindrical filter element, which preferably should be in the range of 10–30.

Tests have shown that relatively short operating cycles of less than 0.5 s between two successive intake operations are possible without impairing the service life of the filter element, if the latter extends over more than one third of the length of the chamber between the inlet and the outlet and preferably has a length that is about half the length of the chamber.

Another preferred embodiment of the invention provides that the sections of the cylindrical wall of the chamber that are adjacent to the ends of the filter element are designed to be elastic, and that the inlet and outlet are located in the vicinity of the elastic cylindrical wall sections and are closed gas-tight by a pneumatically operated pinch valve.

The inlet and outlet of the chamber are preferably located at the opposite ends of the chamber, so that, when a single chamber is used, which is alternately acted on by compressed gas and negative pressure, the conveyance route can pass through the chamber in a straight line, i.e., without turns or bends. The smallest possible pressure drop along the conveyance route is also achieved, if the filter element and the other chamber have an inside diameter that is essentially the same as the inside diameter of a feed line between the reservoir and the chamber and the inside diameter of the delivery line, so that there are no large changes in the cross section of the conveyance route.

In accordance with another preferred embodiment of the invention, the compressed gas is fed into the chamber during the conveyance of the powdered material through the filter element to remove powdered material adhering to the inner side of the filter element that faces the chamber. However, due to triboelectric charging of the powdered material during conveyance, electrostatic adherence of powder particles can also occur elsewhere in the chamber. The surge of compressed gas through the filter element may not always be sufficient to clean off this powder. Therefore, this cleaning is effectively accomplished by passing compressed air past the filter element by feeding it into the chamber through a cleaning valve.

To prevent powdered material from escaping from the chamber through this cleaning valve when compressed gas is being admitted into the chamber during conveyance through the filter element, the cleaning valve preferably has a diaphragm, which is elastically deformed during the feeding of compressed gas through the cleaning valve and opens an intake port for the compressed gas into the chamber, and which, after completion of the feeding of compressed gas through the cleaning valve, is restored to its original shape, in which it tightly seals the intake port. The diaphragm may consist, for example, of an elastic rubber hose coupling, which is drawn over the circumferential wall of a pipe connection, which is closed at its free end and whose circumferential wall is provided with openings. During the feeding of compressed gas into the inside of the pipe connection, the elastic rubber hose coupling is lifted from the circumferential surface of the pipe connection by the pressure of the gas, so that the compressed gas can flow between the diaphragm and the circumferential wall into the chamber.

While it would basically be possible to use a diaphragm pump to produce the negative pressure necessary to draw powdered material into the chamber, another preferred embodiment of the invention provides for the use of a so-called vacuum injector, which is acted upon by compressed air from the compressed air source and produces a negative pressure by the venturi principle.

To achieve an even faster operating cycle, it is advantageous, as is already well known, to provide the device with two chambers, one of which is always being filled, while the other is being emptied. In this case, the two chambers are preferably aligned parallel to each other and connected by Y-shaped sections of line with a common feed or conveyance line, such that each of the angles between the leg and the two arms of the Y and each of the angles at the ends of the arms at the transition to the parallel chambers is preferably less than 30° in order to ensure material conveyance that is as unobstructed as possible and undergoes low pressure losses.

To simplify the design of the device with a double chamber, the inlets and outlets of both chambers are opened and closed with only two closure mechanisms, one of which closes the inlet of the first chamber and simultaneously opens the inlet of the second chamber, and the other opens the outlet of the second chamber and simultaneously closes the outlet of the first chamber. It is advantageous for each of the two closure mechanisms to comprise a double-acting pneumatic cylinder with two oppositely directed piston rods, whose free ends press against the elastic wall of the adjacent chamber to close its inlet or outlet.

The pneumatic cylinders are preferably controlled by two electromagnetic multiple-way control valves in their compressed air feed lines, so that it is possible to open the inlet and outlet of a chamber at the same time for cleaning purposes, for example, to blow out this chamber together with the feed line and the conveyance line from the reservoir.

Another simplification of the design of the double-chamber device is possible by using a single four-way or five-way control valve for applying negative pressure in one chamber and simultaneously admitting compressed gas into the other. Of its two or three inlets, one is connected with a compressed air source, and the other or others are connected with a negative pressure source, which is preferably designed as a vacuum injector, while each of its two outlets is connected with one of the chambers and is alternately connected with the compressed air inlet or one of the negative pressure inlets by switching the valve.

The invention is explained in greater detail below with reference to specific embodiments shown in the drawings.

Figure 1:
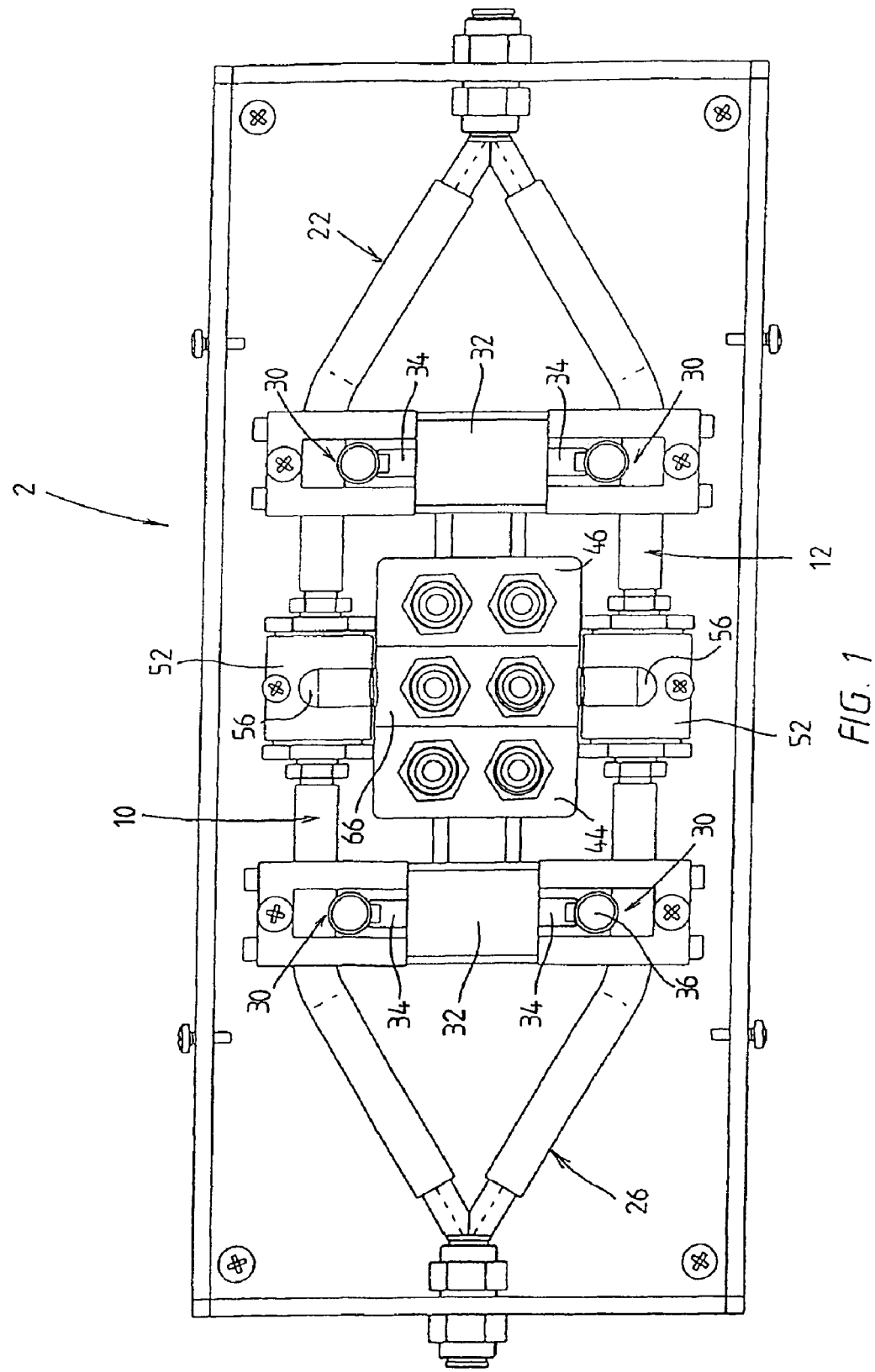
FIG. 1 shows a top view of the device of the invention for the pneumatic conveyance of powder coating material by the dense phase process with two conveying chambers.

The devices 2 shown in the drawings of FIGS. 1, 2, 7, and 8 are used for the pneumatic conveyance of powder coating material 4 for the electrostatic powder coating of objects. The powdered material is conveyed in dense phase from a reservoir 6 to a spray gun 8.

The devices 2 have two parallel cylindrical conveying chambers 10, 12, whose oppositely open ends form an inlet 14, 16 or an outlet 18, 20 for the powder coating material 4 that is being conveyed and are connected with a Y-shaped section 22 of a feed line 24 leading to the reservoir 6 and with a Y-shaped section 26 of a flexible delivery line 28 leading to the spray gun 8.

Each of the two conveying chambers 10, 12 can be closed near its inlet 14, 16 and its outlet 18, 20 by a pinch valve 30. The pinch valves 30 for the two inlets 14, 16 and the pinch valves 30 for the two outlets 18, 20 are operated by two double-acting pneumatic cylinders 32 located between the two conveying chambers 10, 12. Each of the two pneumatic cylinders 32 has two piston rods 34, which extend from opposite ends. Their spherically rounded free ends 36 at the inlet 14, 16 or the outlet 18, 20 engage an elastically deformable, pliable inner wall section 42 of the chamber 10, 12 through recesses 38 in a rigid cylindrical outer wall section 40 of the adjacent conveying chamber 10, 12. This presses the inner wall section 42 against an opposite part of the chamber wall and seals the inlet 14, 16 or the outlet 18, 20 airtight. Except in the area of the recesses 38, the elastic inner wall sections 42 are firmly connected with the rigid sections of the outer wall to prevent them from contracting when a negative pressure is applied in the chamber 10, 12.

Figure 2:
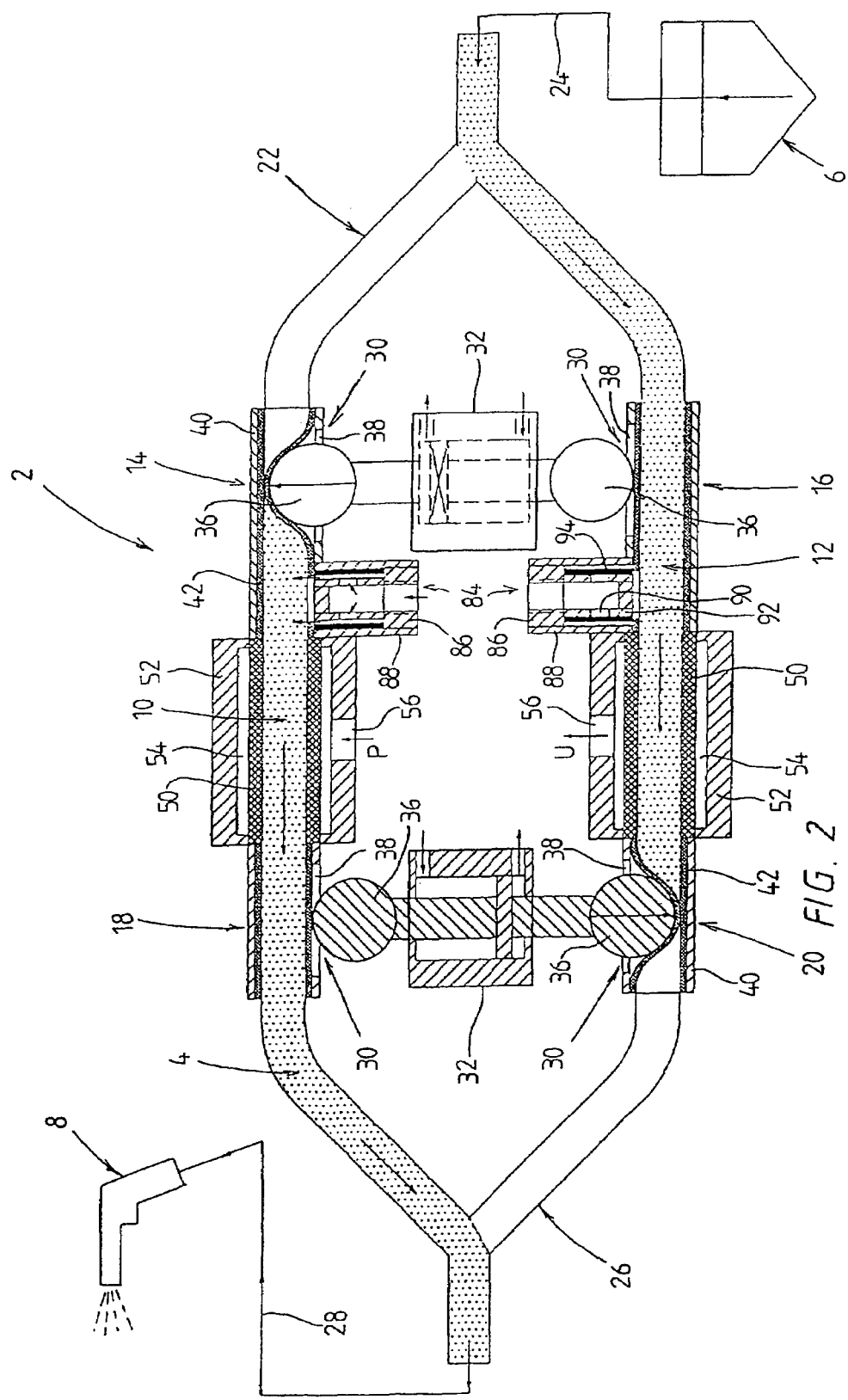
FIG. 2 shows a partially cutaway and somewhat schematic view of the device of FIG. 1.
Figure 4:
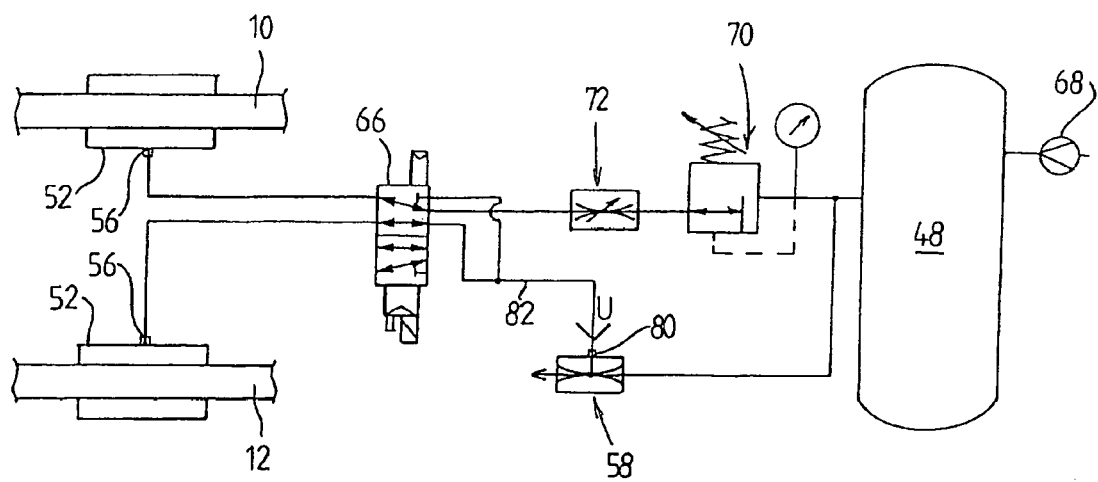
FIG. 4 shows a simplified pneumatic circuit diagram of part of the device.
Figure 5:
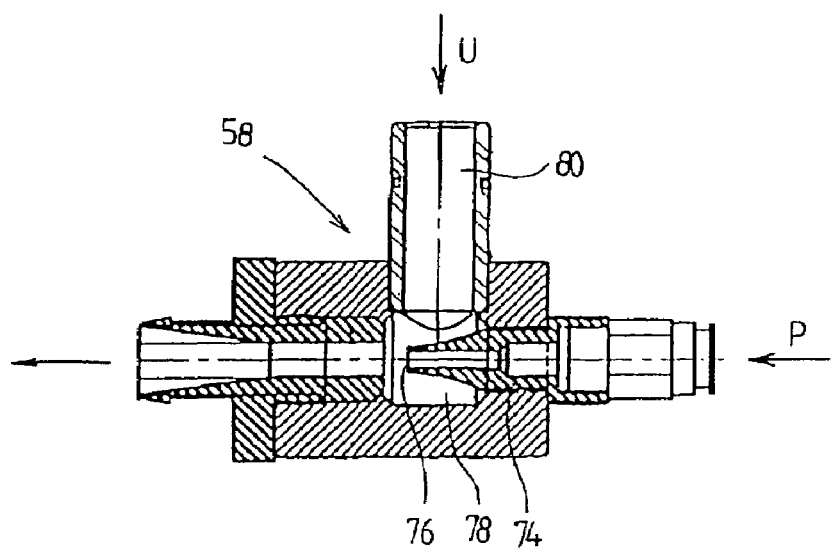
FIG. 5 shows a sectional view of a preferred negative pressure generator of the device.
Figure 8:
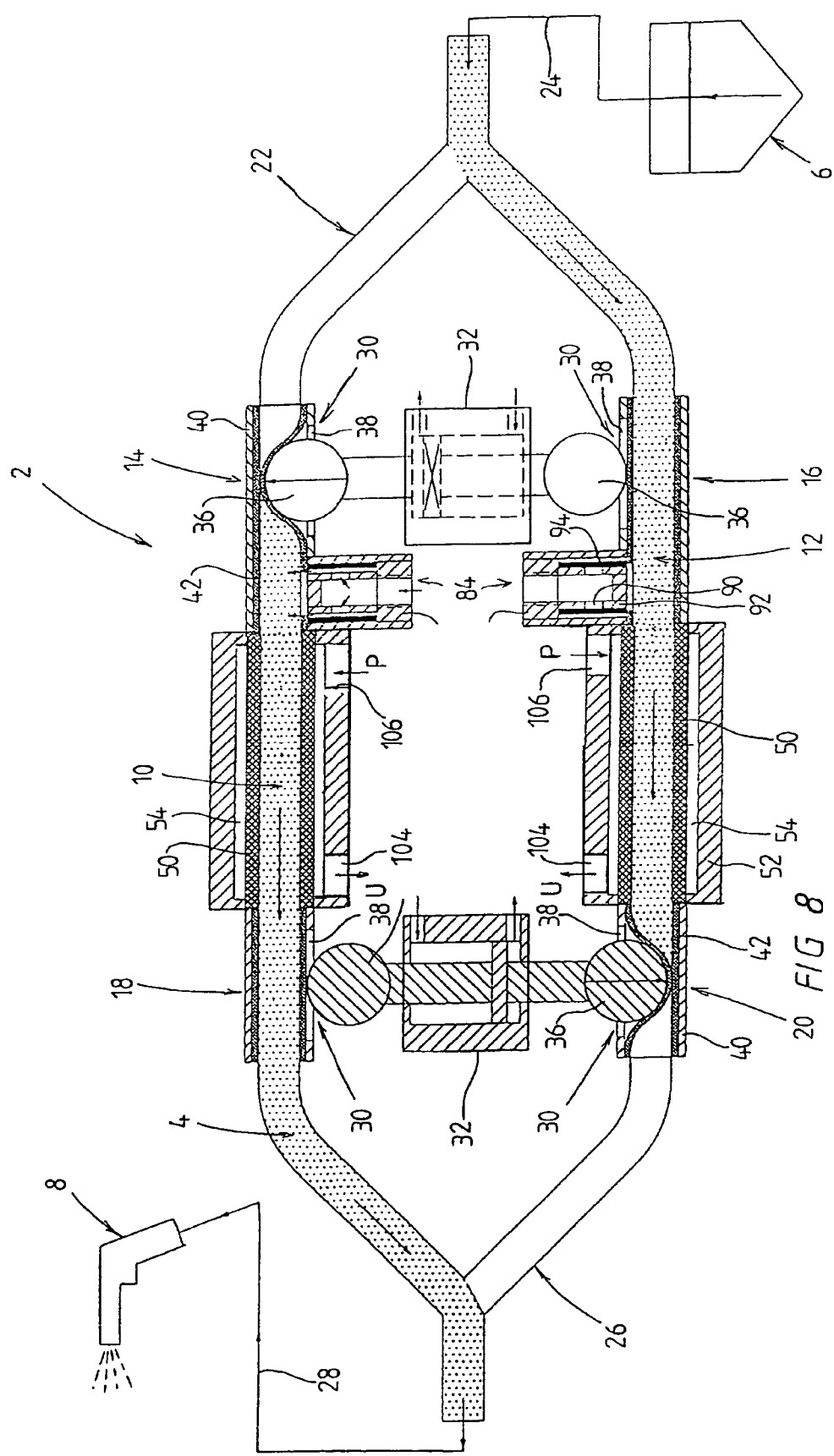
FIG. 8 shows a view of the device in FIG. 7, which corresponds to FIG. 2.
Figure 10:
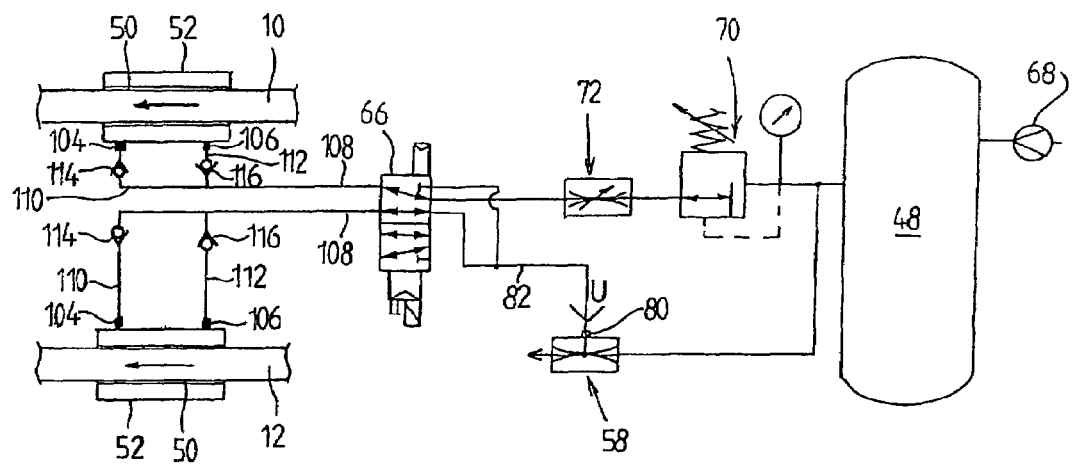
FIG. 10 shows a simplified pneumatic circuit diagram of part of the device in FIGS. 7 and 8.

The two pneumatic cylinders 32 are each connected by an electromagnetic multiple-way control valve 44, 46 (FIGS. 1 and 7) with a compressed air tank 48 (FIGS. 4 and 10). During the conveyance operation, the two control valves 44, 46 are always operated in such a way that the pneumatic cylinders 32 are acted upon crosswise by compressed air, so that in one chamber 10, the inlet 14 is open and the outlet 18 is closed, while in the other chamber 12, the inlet 16 is closed and the outlet 20 is open, or vice versa (as shown in FIGS. 2 and 8).

To allow powder coating material 4 to be drawn from the reservoir 6 into the chamber 10 or 12 with the open inlet 14 or 16 and to be discharged from the chamber 12 or 10 and into the delivery line 28 with the outlet 20 or 18 open, the two chambers 10, 12 are each provided with a hollow-cylindrical filter element 50, which is permeable to air and impermeable to the powder coating material 4. This filter element 50 borders on the chamber 10, 12 between its inlet 14, 16 and its outlet 18, 20 along part of its length in the circumferential direction and forms a section of the circumferential wall of the chamber 10, 12.

The hollow-cylindrical filter element 50 consists of sintered polyethylene with a wall thickness of 2–4 mm and a pore size of about 5 μm and has an inside diameter of 5–30 mm, which basically corresponds to the inside diameter of the adjoining wall sections 40, 42 on either side, the Y-shaped sections of line 22 and 26, and the feed line 24 and the delivery line 28. The filter element 50 extends along about half the length of the chamber (measured between the centers of the pinch valves 30). At its two ends, the filter element is connected airtight with the adjoining sections 40, 42 of the circumferential wall.

Figure 3:
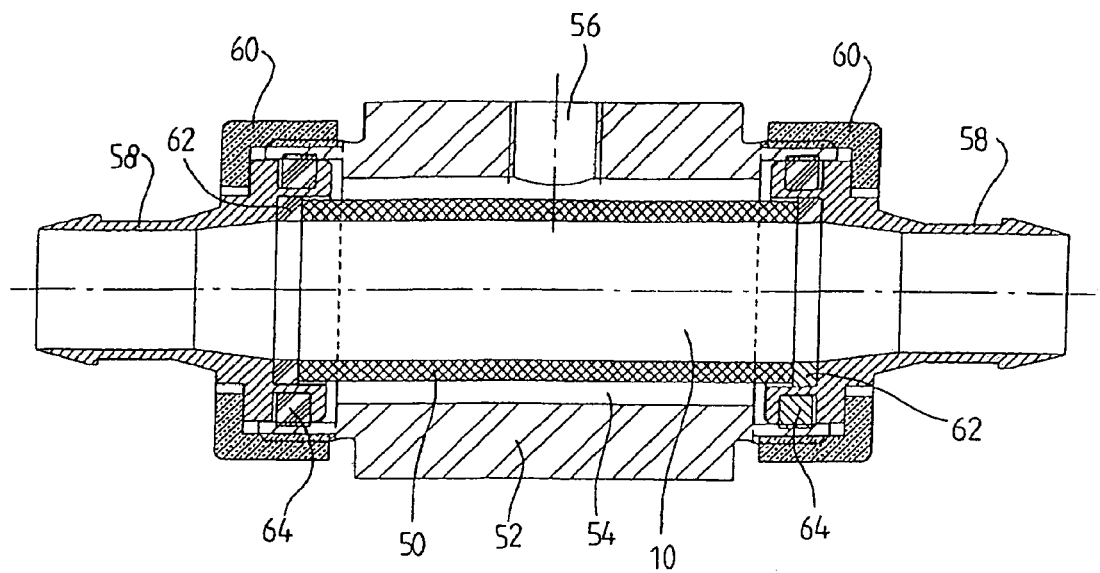
FIG. 3 shows an enlarged longitudinal section of part of one of the two conveying chambers of the invention.
Figure 9:
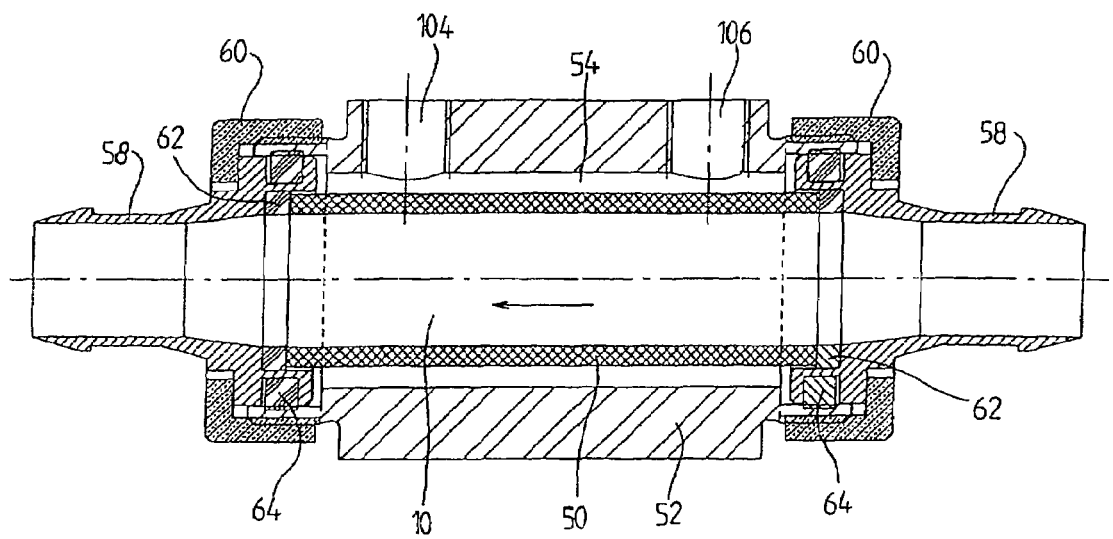
FIG. 9 shows an enlarged longitudinal section of part of one of the two conveying chambers of the device in FIGS. 7 and 8, which corresponds to FIG. 3.

As is shown best in FIGS. 3 and 9, each filter element 50 is surrounded by a housing 52, which is separated from the filter element 50 by a cylindrical annular space 54. In the device shown in FIGS. 1 and 2, the housing 52 has a connection 56, which can be alternately acted upon by negative pressure from a negative pressure source 58 (FIG. 4) and by compressed air from a compressed air tank 48 (FIG. 4). At the two opposite ends of the housing 52 and the filter element 50, there is a hose connection 58, onto which the adjoining elastically pliable circumferential wall section 42 can be pushed and fastened by hose clips (not shown). The hose connections 58 are screwed together with the housing 52 by screw caps 60. Gaskets 62, 64 inserted between the hose connections 58 and the filter element 50 and the housing 52 prevent compressed air from escaping from the chamber 10, 12 or from the annular space 54 of the housing 52, when compressed air is admitted to the chamber 10, 12 in this region, and prevent outside air from entering the chamber 10, 12 or the annular space 54, when negative pressure is applied to the chamber 10, 12.

As is shown best in FIG. 4, the compressed air/negative pressure connection 56 around the housing 52 of each conveying chamber 10, 12 is alternately connected by an electromagnetic 5-way control valve 66 with the negative pressure source 58 and with the compressed air tank 48 to apply negative pressure to the given chamber 10, 12 to draw powder coating material 4 out of the reservoir 6 with the inlet 14 or 16 open and the outlet 18 or 20 closed or to feed compressed air into the chamber 10, 12 to discharge the powder coating material 4 previously drawn into the chamber 10, 12 with the inlet 14 or 16 closed and the outlet 18 or 20 open and convey it through the delivery line 28 by the dense phase or so-called plug flow method.

The compressed air tank 48, which can be filled with compressed air by a compressor 68, is connected with one of the three inlets of the 5-way control valve 66 via a pressure regulator 70 and a throttle 72. The other two inlets of the 5-way control valve 66 are connected by a line 82 with the negative pressure source 58, which is designed as a vacuum injector in the embodiment shown in the drawing.

As is shown best in FIG. 5, the vacuum injector 58 has an injector nozzle 74, which is supplied with compressed air P from the compressed air tank 48. During the feeding of compressed air into the injector nozzle 74, a negative pressure is produced by the venturi principle in an annular space 78 surrounding the outlet 76 of the injector nozzle 74. This negative pressure is applied via a connecting socket 80 and the line 82 to the two inlets of the 5-way control valve 66 that are connected with the negative pressure source 58 and, with each switching of the 5-way control valve 66, is alternately applied to one of the two chambers 10, 12, while, at the same time, the other chamber 12, 10 is being supplied with compressed air.

Instead of a 5-way control valve, a 4-way control valve may also be used, which has two inlets, one of which is connected with the compressed air tank 48, and the other is connected with the negative pressure source 58, while each of the two outlets is connected with one of the two chambers 10, 12, so that, with each switching of the valve, the chambers are alternately acted upon by compressed air and negative pressure.

At the same time that the 5-way control valve 66 is being switched, the two multiple-way control valves 44, 46 (FIG. 1) in the compressed air feed lines of the pneumatic cylinders 32 are also being switched, in order to close the outlet 18 or 20 and open the inlet 14 or 16 of the chamber 10 or 12 that has just been emptied and to close the inlet 16 or 14 and open the outlet 20 or 18 of the chamber 12 or 10 that has just been filled.

As is shown best in FIG. 2, the application of a negative pressure U with the inlet 16 open causes powder coating material 4 to be drawn from the reservoir 6 and the feed line 24 into one of the chambers 12, while the compressed air P fed into the other chamber 10 through the filter element 50 forces the powder coating material 4, which had previously been drawn into this chamber 10, through the outlet 18 and through one of the arms of the Y-shaped section of line 26 into the delivery line 28. To ensure conveyance that is as frictionless as possible without large pressure losses, the Y-shaped section of line 26 and the Y-shaped section of line 22 are curved at an angle of less than 30° at each of their bending points, i.e., at the connecting points between the leg and the two arms of the Y and between each arm and the inlet 14, 16 of the corresponding chamber 10, 12.

The compressed air fed into the given chamber 10, 12 during conveyance through the filter element 50 not only forces the powder coating material 4 present in the chamber 10, 12 into the delivery line 28, but also cleans the cylindrical inside surface of the filter element 50 of adhering powder coating material 4, which had previously been drawn onto this surface by the previously applied negative pressure. It was found, however, that the pressure surge produced inside the chamber 10, 12 by the admission of compressed air into the chamber 10, 12 is not always sufficient to also clean the remaining inner surfaces of the chamber 10, 12 of powder particles, since the powder particles can adhere relatively strongly to the surfaces of the chamber 10, 12 due to a triboelectric charge.

To be sure, to clean a conveying chamber, for example, chamber 10, it is basically possible, by suitable switching of the multiple-way control valves 44, 46 of the pneumatic cylinders 32, to open both the inlet 14 and the outlet 18 of this chamber 10 (and to close the inlet 16 and the outlet 20 of the other chamber 12), and then to blow out this chamber 10, together with the delivery line 26 and the feed line 24 from the reservoir 6 or from the spray gun 8.

However, since this manner of cleaning the entire conveyance line is not always desired, the two chambers 10, 12 are each equipped with an additional cleaning valve 84 (FIGS. 2 and 9), through which compressed air can be blown into the interior of the chamber 10, 12 to clean the chamber. The cleaning valve 84, which opens radially into the chamber 10, 12 from the side between the filter element 50 and the inlet 14,16 (or the outlet 18, 20), consists essentially of a metallic pipe fitting 86 with an annular cross section, which is screwed airtight into an internally threaded bore of a pipe connection 88 projecting beyond the chamber wall 42 by means of an external thread on its thicker end facing away from the chamber 10, 12, and whose thinner end facing the chamber 10, 12 is closed at its end face and has several radial drill holes 90 in the wall 92 of its cylindrical surface (cf. FIG. 6). A diaphragm in the form of a hose coupling 94 made of an elastic rubber material is fastened on the thinner end of the pipe fitting 86. The diaphragm rests loosely against the peripheral surface of the pipe fitting 86 under tensile force and seals the drill holes 90, as shown at the bottom in FIGS. 2 and 9. During the admission of compressed air into the cleaning valve 84, the diaphragm 94 is lifted from the outer peripheral surface of the pipe fitting 86 by the compressed air, so that the compressed air can flow between the diaphragm 94 and this peripheral surface and into the chamber 10, as shown at the top of FIGS. 2 and 9. Upon completion of the admission of compressed air, the deformed diaphragm 94 moves back against the peripheral surface of the pipe fitting 86 due to its elastic restoring force and prevents powder coating material 4 from escaping through the cleaning valve 84 when compressed air is later admitted into the chamber 10, 12.

Figure 6:
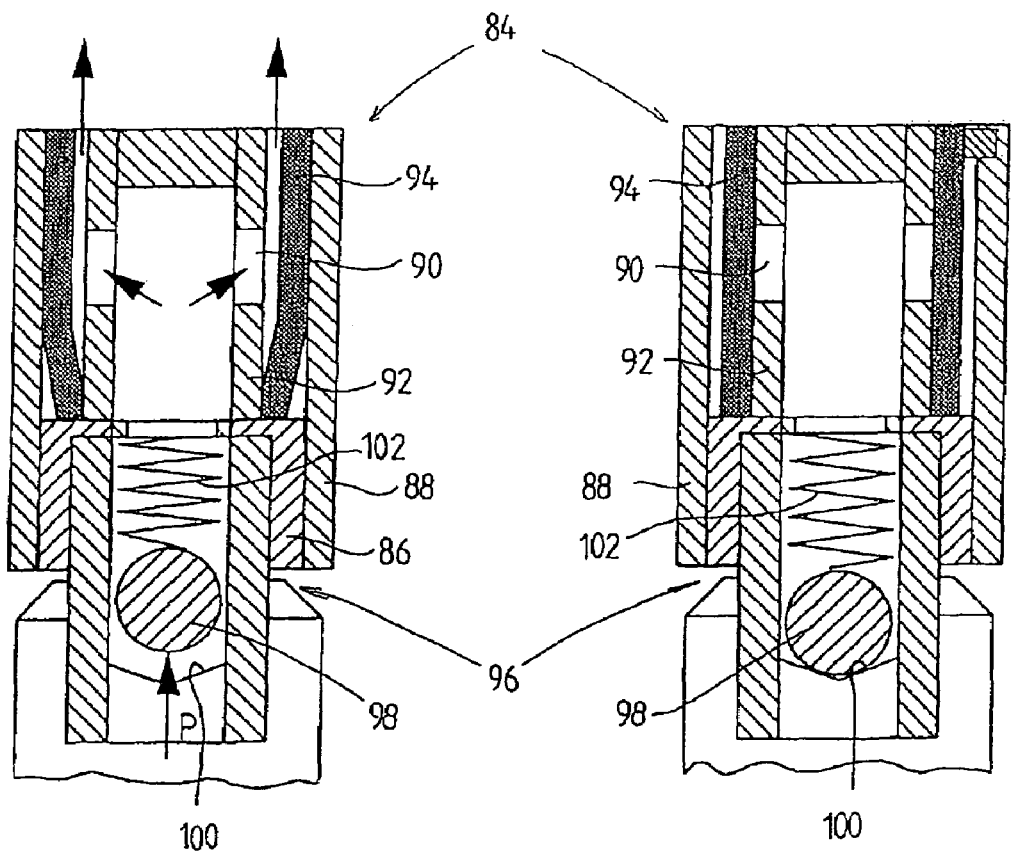
FIG. 6 shows a longitudinal section of an alternative cleaning valve for feeding compressed air for cleaning into the conveying chambers.
Figure 7:
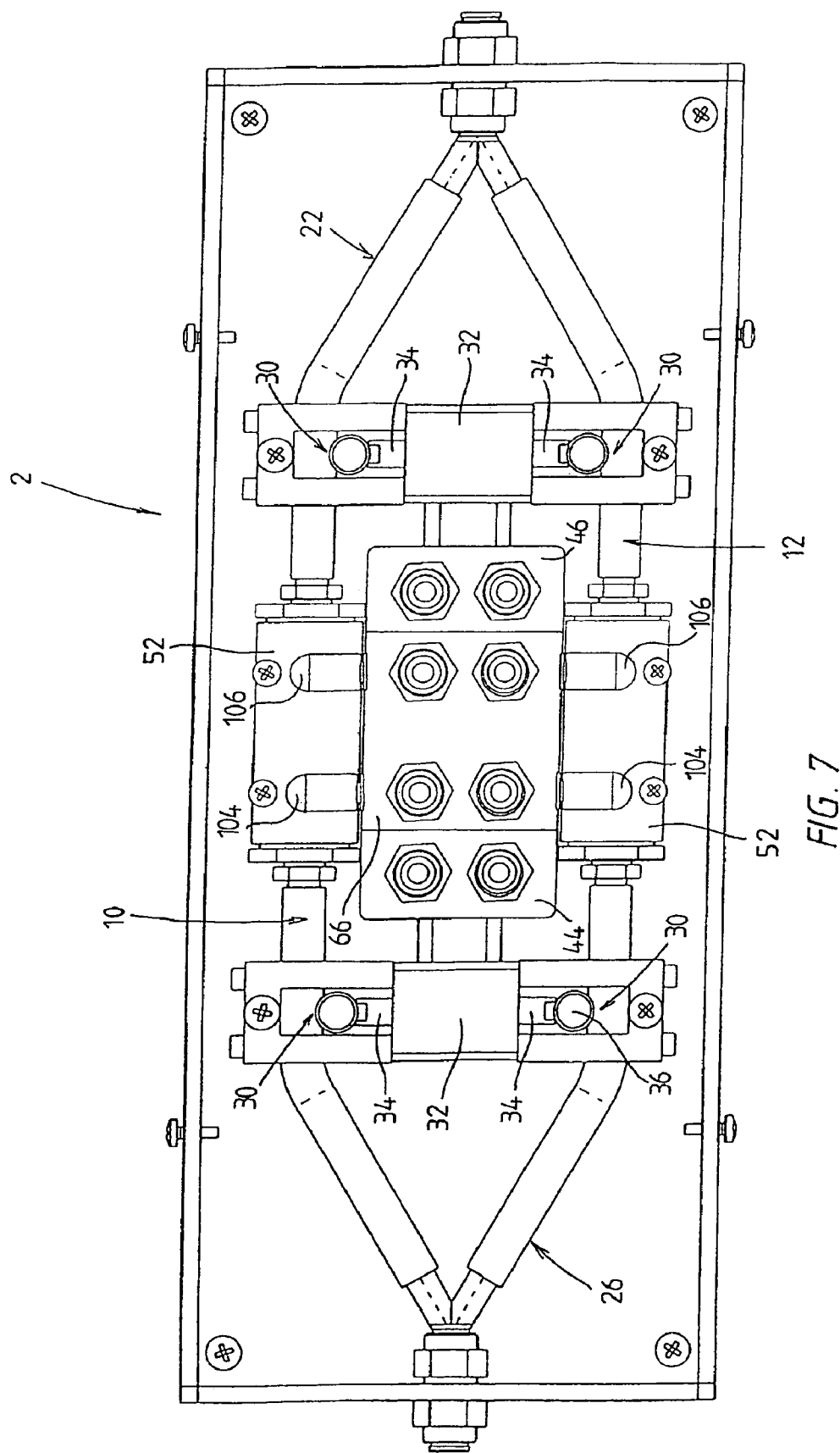
FIG. 7 shows a top view of another device of the invention, which corresponds to FIG. 1.

In the enlarged view of the cleaning valve 84 shown in FIG. 6, a ball check valve 96 is provided in addition to the diaphragm. When compressed air is fed into the valve 96, the ball 98 of this valve is forced from its seat against the force of a spring 102.

In contrast to the device 2 in FIGS. 1 to 6, in the device 2 in FIGS. 7 to 10, the housing 52 of each filter element 50 is provided with two connections 104 and 106. While one of the connections 104 is located near outlet end of the filter element 50 and can be acted upon by negative pressure, the other connection 106 is located near the inlet end of the filter element 50 and can be acted upon by compressed air P from the compressed air tank 48.

As is best shown in FIG. 10, a line 108 branches off for this purpose between the five-way control valve 66 and the housing 52 of each filter element, such that a spring-loaded nonreturn valve 114, 116 is inserted in opposite directions of installation into each of the two branch lines 110 and 112 that lead to the connections 104 and 106, so that, when compressed air is fed into the line 108, the nonreturn valve 114 located in front of the connection 104 opens against the force of the spring, while the nonreturn valve 116 located in front of the connection 106 remains closed. On the other hand, when a negative pressure is applied to the line 118, the nonreturn valve 116 opens against the force of the spring, while the nonreturn valve 114 remains closed.

In addition, to further increase the conveyance capacity of the device 2, the hollow-cylindrical filter elements 50 in the device shown in FIGS. 7 to 10 have a greater length and a greater ratio of length to inside diameter, namely, a length of 80 and 250 mm, respectively, with an inside diameter of 6 and 12 mm, respectively, and a corresponding chamber length between the centers of the pinch valves 30 on the inlet and outlet sides of 180 and 400 mm, respectively.

The invention claimed is:

1. A device for the pneumatic conveyance of powdered material, comprising: a powder material supply, a first chamber and a second chamber, a delivery line, the first chamber connected to the powder material supply through a first pinch valve, the second chamber connected to the powder material supply through a second pinch valve, the first chamber connected to the delivery line through a third pinch valve, the second chamber connected to the delivery line through a fourth pinch valve, wherein one of said chambers receives powder from the supply while the other of said chambers discharges powder to the delivery line in alternating sequence, each said chamber being at least partially defined by a wall of a rigid hollow cylinder formed of a gas-permeable material, and to which negative pressure can be applied through the gas-permeable material to draw gas out of the chamber to receive powder material from the supply, and into which compressed gas can be admitted through the gas permeable material into the chamber to force the powdered material, which had previously been drawn into the chamber, out of the chamber to the delivery line.

2. The device of claim 1 wherein the gas-permeable element comprises a sintered material.

3. The device of claim 2 wherein said material comprises sintered plastic powder.

4. The device of claim 3 wherein said material comprises a pore size of less than about 20 micrometers.

5. The device of claim 3 wherein said material comprises a pore size of less than about 5 micrometers.

6. The device of claim 1 comprising a source of pressurized purge gas, and a valve for admitting purge gas into the chamber other than by filtering through said gas-permeable wall.

7. The device of claim 6 wherein the compressed gas that passes through the gas-permeable wall and forces material out the chamber also cleans an interior surface of the gas-permeable wall.

8. The device of claim 1 wherein each said cylinder has a longitudinal axis, and further wherein material enters the chamber from one axial end thereof and exits the chamber from the opposite axial end thereof.

9. The device of claim 8 wherein said first and second chambers are arranged side by side with parallel longitudinal axes.

* * * * *

UNITED STATES PATENT AND TRADEMARK OFFICE
CERTIFICATE OF CORRECTION

| | |
|---|---|
| PATENT NO. | : 7,150,585 B2 |
| APPLICATION NO. | : 10/501693 |
| DATED | : December 19, 2006 |
| INVENTOR(S) | : Andreas Kleineidam et al. |

It is certified that error appears in the above-identified patent and that said Letters Patent is hereby corrected as shown below:

Column 1, line 29, "DE 196 54 649" should read --DE 196 54 648--.

Signed and Sealed this

Second Day of December, 2008

JON W. DUDAS
*Director of the United States Patent and Trademark Office*